US006574571B1

(12) United States Patent
Bonnat

(10) Patent No.: US 6,574,571 B1
(45) Date of Patent: Jun. 3, 2003

(54) METHOD AND DEVICE FOR MONITORING AN ELECTRONIC OR COMPUTER SYSTEM BY MEANS OF A FLUID FLOW

(75) Inventor: Pierre Bonnat, Grieges (FR)

(73) Assignee: Financial Holding Corporation, Inc., Las Vegas, NV (US)

( * ) Notice: Subject to any disclaimer, the term of this patent is extended or adjusted under 35 U.S.C. 154(b) by 0 days.

(21) Appl. No.: 09/913,398

(22) PCT Filed: Feb. 14, 2000

(86) PCT No.: PCT/FR00/00362

§ 371 (c)(1),
(2), (4) Date: Aug. 10, 2001

(87) PCT Pub. No.: WO00/48066

PCT Pub. Date: Aug. 17, 2000

(30) Foreign Application Priority Data

Feb. 12, 1999 (FR) ........................................... 99 01958

(51) Int. Cl.[7] ................................................ G01F 1/00
(52) U.S. Cl. ......................................... 702/48; 345/163
(58) Field of Search ............................. 702/48, 45, 50, 702/54, 55, 56, 100, 104; 345/163, 173; 128/204.23; 119/713; 84/727; 250/227.21; 600/538

(56) References Cited

U.S. PATENT DOCUMENTS 4,713,540 A * 12/1987 Gilby et al. ........... 250/227.21
4,746,913 A 5/1988 Volta
5,378,850 A * 1/1995 Tumura ....................... 84/727
5,763,792 A * 6/1998 Kullik ........................ 600/538
5,889,511 A * 3/1999 Ong et al. .................. 345/173
5,907,318 A * 5/1999 Medina ...................... 345/163
6,213,955 B1 * 4/2001 Karakasoglu et al. .. 128/204.23
6,396,402 B1 * 5/2002 Berger et al. .............. 119/713

* cited by examiner

*Primary Examiner*—John Barlow
*Assistant Examiner*—Xiuqin Sun
(74) *Attorney, Agent, or Firm*—Blakely, Sokoloff Taylor & Zafman LLP

(57) ABSTRACT

Monitoring system electronic or computer.

Device for monitoring an electronic or computer system with the aid of a fluid current, characterized in that it includes:

means to apply the fluid current to at least one free segment and make said segment vibrate, at least one conversion device for converting the vibrations of the segment into an electric signal, means for processing the electric signal emitted by the conversion device, and interface means between the processing means and the electronic or computer system.

15 Claims, 2 Drawing Sheets

METHOD AND DEVICE FOR MONITORING AN ELECTRONIC OR COMPUTER SYSTEM BY MEANS OF A FLUID FLOW

The present application claims the benefit of the filing date of PCT patent application number PCT/FR00/00362, and French patent application number 99/01958.

The invention concerns the technical field for monitoring electronic or computer systems by means of capture or checking peripherals.

In a preferred but not exclusive application, the invention concerns monitoring the movement of a pointer or cursor on the screen of a computer using a checking peripheral.

In this preferred application field, a device known as a mouse is used for transforming movements into controls required by a user. The mouse is formed by a box equipped with electronic means connected to the computer for transforming the movements of the box on the working surface into a movement of the cursor or pointer on the computer screen.

Thus, a mouse more generally includes a ball for rolling over the working surface, sensors to detect the movements of the ball and means for processing the electric signals of the sensors. The processing means are connected to the computer by an electric cable or a Hertzien or infrared link. The processing means have been designed to deliver signals recognised by the protocol of the port to which the mouse is connected, usually corresponding to the standard RS 232. However, the mouse can also be connected to the computer via a dedicated interface card or to a specific bus in which case the processing means shall deliver one or several signals recognised by the protocol associated with this interface card or bus.

The mouse may in addition include a certain number of push or scrolling buttons which are also connected to the processing means and which correspond to validation or data entry function according to the operating mode of the computer.

The means for processing the signals derived from the movement sensors and the position sensors of the scrolling or input buttons then provide several principal functions, namely:

detection of the movement of the mouse, detection of the position of the push-buttons, and communication with the computer as per the retained standard.

Communication with the microcomputer is more usually managed by a microprocessor ensuring the two parts of the processing of the signals derived from the movement and position detectors of the push-buttons. The mouse also contains means to control the electric feeding of the means for processing the signals and possibly that of the movement detection and position sensors.

Finally, the mouse is associated with a control software loaded into the computer which decodes the signal transmitted by the mouse. The driver provides the application software requesting it information concerning the state and status of the mouse: firstly the movement and secondly the position of the push-buttons so as to enable them to carry out the resultant actions.

In its most frequently used operating mode, the driver communicates with the sub-programme or movement routine of the cursor or pointer when the mouse is moved and sends messages to the programme when the push-buttons of the mouse are pressed.

It ought to be said that for most of the drivers used, the movement of the pointer on the screen does not correspond directly to that of the mouse. In fact, it has been observed that the movement of the mouse can be broken down into two main movements, namely movement of the mouse until the pointer is brought into the desired zone and then its precise positioning on the targeted point or object. Thus, when the mouse is moved slowly, the driver generates a movement of the pointer on the screen of about 100 CPI (Counts Per Inch) or DPI (Dots Per Inch), and when the mouse is moved quickly, the driver generates a movement of the pointer of about 400 CPI, indeed 1000 CPI.

According to the prior art, the mouse gives full satisfaction as a control peripheral of a computer when using the hand.

However, it may appear necessary to be able to control a computer or electronic system without resorting to using the hands, especially when the user is unable to do so.

Thus, it has been considered on controlling a computer or electronic system via the breath with the aid of a control device introducing a helical wheel or turbine moved by the breath of the user and whose rotation is processed and converted into an electric signal according to a standard approximately similar to the one associated with a mouse so as to be recognised by the driver and thus convert rotation of the wheel into a movement of the cursor on the screen.

However, it appears that this wheel control system does not offer high checking accuracy having regard to the inertia of the wheel which continues to rotate after stopping applying the breath of said user.

Thus, it seems necessary to have a method and device for monitoring an electronic or computer system using the breath of a user and possessing greater precision and control sensitivity than offered by system of the prior art.

So as to meet this objective, the invention concerns a method for monitoring an electronic or computer system, characterised in that it consists of:

making vibrate at least one free segment with the aid of a fluid current, translating the vibrations on the segment into an electric signal with the aid of at least one conversion device associated with the segment, processing the electric signal transmitted by the conversion device, and monitoring an action of the system according to the results of the processing of the electric signal.

In one preferred application, the invention concerns a method making it possible to obtain the same functionalities as those corresponding to the movements of a mouse by using the breath of a user.

So as to attain this objective, according to another characteristic of the invention, in order to control movements by the breath along two directions X and Y the method consists of a pointer or cursor on the computer screen so as to:

implement for each movement direction a conduit housing two free segments associated with conversion devices, the first segment being able to be stressed on vibration by the expiration (breathing out) flow and the second abler to be stressed on vibration by the inspiration (breathing in) flow.

process the signals transmitted by the conversion devices so that, for each movement direction the inspiration flow corresponds to a movement direction of the cursor and the expiration flow corresponds to a movement direction opposite the one corresponding to the inspiration flow and so that the intensity of the flow corresponds, at least in part, to the movement speed of the cursor.

The invention also concerns a device for converting into an electric signal the action of a fluid current on at least one free segment. According to the invention, this conversion device includes means for directly converting the mechanical vibrations of the free segment into an electric signal.

According to one characteristic of the invention, the conversion means are formed by a piezo-electric transducer integral with the free segment.

According to another characteristic of the invention, the conversion means are formed by an electromagnetic transducer including a magnet and a transducing coil associated with a magnetic circuit including a ferromagnetic portion provided by the segment at the level of its free extremity whose vibrations disturb the magnetic field generated by the magnet and induce an electromotive force in the coil.

According to a further characteristic of the invention, the conversion means are formed by the association of a light source and a light sensor both arranged so that the vibrations of the segment disturb illumination of the sensor so as to create a variable electric signal at the terminals of the sensor.

The invention also concerns a device for monitoring an electronic or computer system using a fluid current. According to the invention, this monitoring device includes:

- means to apply this fluid current to at least one free segment and make said segment vibrate,
- at least one device according to the invention-for converting the vibrations of the segment into an electric signal,
- means for processing the electric signal transmitted by the conversion device,
- and interface means between the processing means and the electronic or computer system.

The invention also concerns a device for the breath of a user monitoring the movement along two directions X and Y of a pointer or cursor on a computer screen.

According to the invention, this device includes:

- for each movement direction a conduit housing two free segments associated with conversion devices according to the invention, the first segment being able to be stressed on vibration by the expiration flow and the second being able to be stressed on vibration by the inspiration flow,
- means for processing the signals transmitted by the conversion devices so that for each direction of movement the inspiration flow corresponds to a movement direction of the cursor and the expiration flow corresponds to a movement direction opposite the one corresponding to the inspiration flow and so that the intensity of the flow corresponds, at least in part, to the movement speed of the cursor.

Various other characteristics appear in the following description with reference to the accompanying drawings which show by way of non-restrictive examples the embodiments of the object of the invention.

Figure 1:
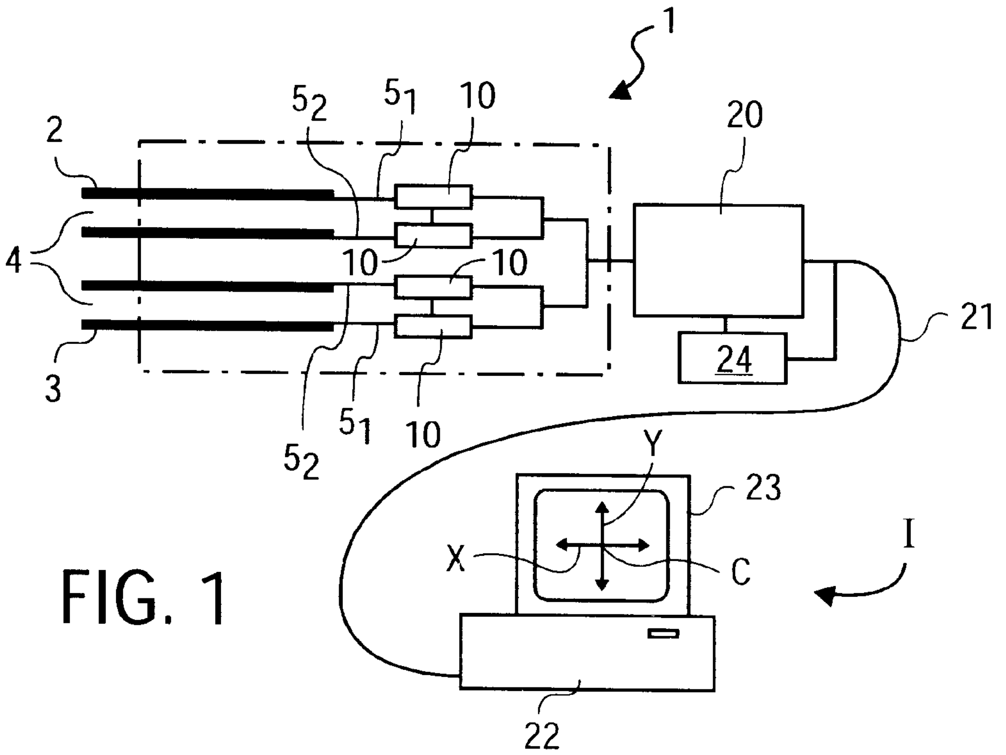
FIG. 1 is a diagrammatic view of a preferred embodiment of a device conforming to the invention for monitoring the movement of a pointer on a computer screen.
Figure 2:
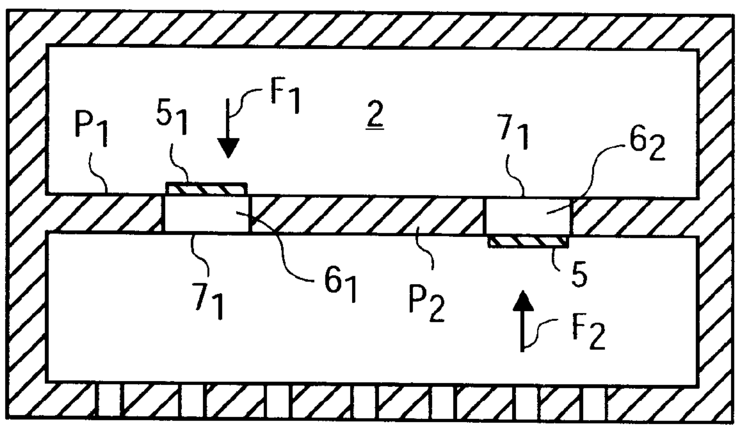
FIG. 2 is a diagrammatic section showing details of the arrangement of the vibrating segments for a monitoring device conforming to the invention.

FIG. 1 diagrammatically illustrates an application example of the invention for a device denoted in its entirety by the reference 1 controlled by the breath of a user for moving the cursor C of a computer system 1.

The monitoring device 1 comprises two tubes 2, 3 associated with a movement direction X or Y of the cursor. Each tube 2, 3 has an orifice 4 at the level of which an individual can breathe in or suck up air. Opposite the orifices 4, each tube 2,3 has two free segments, one $\mathbf{5}_1$ of the latter being stressed by the air expired or on expiration, whereas the other $\mathbf{5}_2$ is stressed by the inspired air or on inspiration. 0

As shown on FIG. 1, each segment $\mathbf{5}_1$ and $\mathbf{5}_2$ is mounted opposite a channel $\mathbf{6}_1$ and $\mathbf{6}_2$ fitted in the wall of the tube 2 or 3. Each channel $\mathbf{6}_1$, $\mathbf{6}_2$ has dimensions similar to the dimension of the associated segment whilst being slightly larger so that the segment can flap in the channel. So as to ensure vibrating of each of the segments $\mathbf{5}_1$, $\mathbf{5}_2$ by its corresponding stress breath, each segment is placed so as to be flush with the plane $P_1$ or $P_2$ of the wall of the tube 2 situated upstream with respect to the direction of the expiration flow $F_1$ or $F_2$ for stressing said segment. Thus the segment $\mathbf{5}_1$, which needs to be stressed by the expiration flow $F_1$, is flush with the plane $P_1$ inside the tube 2, whereas the segment $\mathbf{5}_2$ needing to stressed by the inspiration flow $F_2$ is flush with the plane $P_2$ outside the tube.

Similarly, so as to provide improved stressing of the segments, each channel $\mathbf{6}_1$, $\mathbf{6}_2$ is preferably, but not necessarily, associated with a non-return clack valve $\mathbf{7}_1$ or $\mathbf{7}_2$ allowing only air to pass in the stress direction of the corresponding segment $\mathbf{5}_1$ or $\mathbf{5}_2$.

Each segment $\mathbf{5}_1$, $\mathbf{5}_2$ of each tube 2, 3 is associated with a conversion device 10 directly transforming the mechanical vibrations of the segment into an electric signal.

Figure 3:
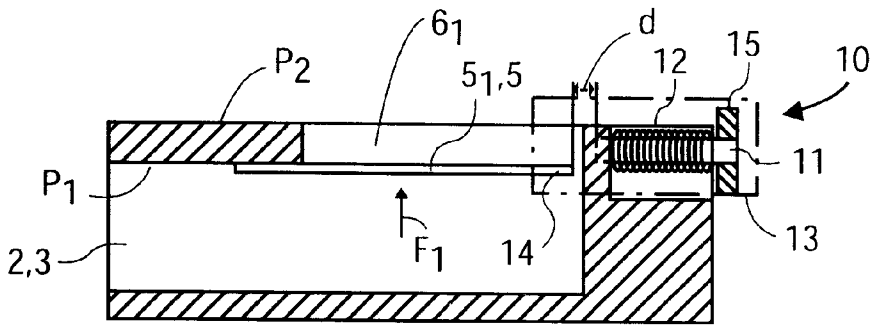
FIG. 3 shows a device for the electromagnetic conversion of the vibrations of a free segment into an electric signal.

According to a preferred embodiment of the invention, these conversion means 10 are, as shown on FIG. 3, formed by an electromagnetic transducer including a magnet 11 and a transducing coil 12 associated with a magnetic circuit 13 symbolised by the dot-and-dash lines. This magnetic circuit includes a ferromagnetic portion presented by the segment 5 at the level of its free extremity 14. The free segment 5 is preferably fully made of a plastic material and an element or ferromagnetic coating is mounted on its extremity. Of course, the segment could be fully made of a ferromagnetic material.

The material constituting the segment 5 has been selected so as to induce a rapid damping of the vibrations of the segment at the end of stressing. In this respect, it needs to be noted that for the choice of this material, the most important criterion is the capacity of the segment to be vibrated under the action of a fluid flow and more particularly a flow of air.

So as to avoid disturbing the functioning of the electromagnetic transducers 10 associated with the free segments $\mathbf{5}_1$, $\mathbf{5}_2$, the body of the monitoring device is preferably embodied, but not exclusively, inside an magnetic material and preferably in a synthetic material, such as an injected plastic material or even a moulded composite material. Moreover, the use of these materials, depending on their implementation conditions, can render the device 1 silent.

According to a preferred, but not exclusive, embodiment, each conversion device 10 includes a mobile adjustment element 15 for coming opposite the segments 5 so allow for an adjustment of the distance d, namely an air gap, separating the foot of the mobile element 15 from the free extremity 14 of the segment 5. According to the example shown, the mobile adjusting element is constituted by a screw forming the core of the transducing coil 1 and extending along a direction approximately parallel to the extension plane of the segment 5.

Each conversion device 10 functions as follows. When a segment 5 is stressed on vibration by a flow of air circulating in the conduit 2 or 3, it starts to vibrate so that the movements of its free extremity 14 disturb the magnetic field generated by the magnet 11 and routed by the magnetic circuit 13. These vibrations then induce an electromotive force in the coil 12. This variable electromotive force creates a current, the oscillations of the latter being the electric image of the mechanical oscillations of the vibrating free segment 5. The electric signal generated by each conversion device 10 is then amplified and/or processed by a processing system 20.

The processing system 20 is connected by a line 21 to an interface with a computer 22 comprising a display screen 23.

The processing system 20 includes the power electronics and a microprocessor able to process the signals derived from the conversion devices 10 so as to condition them according to a specific standard or protocol.

Therefore, if it is decided to connect the device 1 to a mouse port functioning according to the standard RS 232, the system 20 shall then process the signals so as to translate them into this standard. Of course, any other dialogue standard could be adopted according to the nature of the computer system 1.

The system 20 is fed appropriately and, in the case of the use of an RS 232 standard interface, by an auxiliary power source 24 which uses the electric current available at the level of the interface.

The monitoring device 1 thus established may function as follows.

When the user of the computer wishes to control movement along the direction X of the cursor C on the screen 23, he blows into or breathes out in the first tube 2 for example so as to stress on vibration the segment $\mathbf{5}_1$ of this tube. The characteristics of the signal transmitted by the conversion device 10 associated with this segment $\mathbf{5}_1$ then directly depend on the intensity of the blow. The system 20 for processing the electric signal then converts the analog signal derived from the device 10 into a digital signal transmitted by the line 21 to an interface of the computer 22. The system 20 may for example, but not necessarily, process the signal so as to associate value thresholds and/or conversion ratios to the information received from the conversion devices 10. This signal is then interpreted by a Driver programme functioning on the computer 22 into a movement of the cursor C along the direction X towards the right, for example. The movement speed of the cursor C could then directly depend on the intensity of the blowing applied.

When the user sucks up or breathes through the same tube 2, the segment 5 stressed on inspiration shall activate its associated conversion device 10 which shall transmit an electric signal which, after processing by the system 20, could be translated by the interface and the software of the computer 58 into a movement along the direction X towards the left of the cursor C. As previously, the movement speed of the cursor shall depend on the intensity of suction.

Similarly, the fact of breathing out or in through the second tube 3 shall be associated with a movement of the cursor C along the direction Y either upwards or downwards.

The associated Driver of the device 1 could then allow allocation of the tubes 1 and 2 to the movement directions of the cursor C, as well as the movement directions of the cursor C associated on inspiration and expiration.

According to one embodiment variant of the device 1, each segment $\mathbf{5}_1$, $\mathbf{5}_2$ is associated with means for damping its vibrations at the end of stressing so as to guarantee great precision of control of the cursor C.

In accordance with the invention, it appears that the monitoring device 1 is able to obtain functioning of the computer system 22, 23 directly subordinate to or controlled by the breath of a user. The invention then makes it possible to advantageously control an improved computer system by a user who would have lost use of his upper limbs, for example.

So as to have functions similar to those of a conventional mouse, the device 1 of the invention may also include systems of buttons to be activated by pressing one of the buttons.

These systems may be formed by a mobile portion of the orifice which activates a switch when it is pressed from above or is moved from one side to the other.

The breath pointing device may also include an additional conduit including a single free segment 5 associated with a conversion device 10 so as to constitute a monitoring device having a function similar to that of the function button, namely "scroll" present on certain mice make use of a menu.

Of course, this is only one example of one of the possible applications of the invention for monitoring a computer or electronic system.

In fact, the conversion of the vibrations of a free segment into an electric signal can be used for any other computer action than moving of the cursor.

Similarly, the fluid current in the example above is sucked in or breathed out air, but it could also be an air current applied in a suitable way, such as by means of bellows, a blower or a compressed gas reserve or similar element. Equally it could be possible to use another fluid, gas or liquid, for generating vibrations of the segment.

In the examples above, the means for converting movements of the free segment into an electric signal are constituted by an electromagnetic transducing system.

However, in accordance with the invention, the conversion for movements of the free segment into an electric signal could be made in any other way, such as by opto-electronic means formed by the association of a light source and a sensor placed so that the vibrations of the segment creates an interference with the illumination of the sensor.

Figure 4:
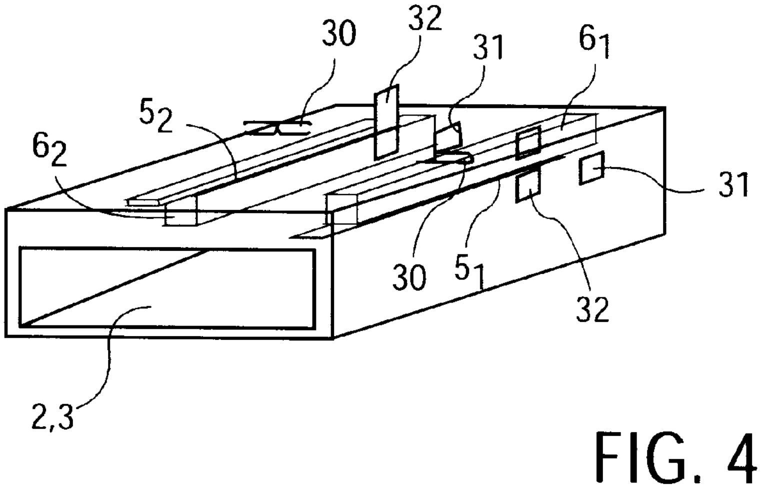
FIG. 4 shows a device for the opto-electronic conversion of the vibrations of a free segment into an electric signal.

Thus, according to one embodiment variant of the invention and shown on FIG. 4, the conversion means are formed for each segment by a light source 30 and a light sensor 31 placed opposite each other and on both sides of the free segment.

Thus, when the segment is stressed on vibration by the breath of the user, its free extremity placed between the corresponding light source and the sensor generates a discontinuous illumination of the sensor so as to create a variable electric signal which shall be processed by the processing system 20 of the monitoring device of the invention, as described previously.

The light source 20 is preferably formed by a light-emitting diode (LED) and the sensor 31 is formed by a phototransistor. So as to avoid daylight disturbing the detection of the vibrations of the segment, the conversion device works in infrared. Similarly, a dark zone is provided close to the light source and sensor. Of course, it is also possible to use a photo-resistor as a light sensor.

So as to increase the surface area of the segment placed between the sensor 31 and the light source 30, the free extremity of the segment may bear a screen 32 for hiding the light source with respect to the sensor in certain positions of the segment and more particularly when the latter is inactive. It is also possible to provide a window, either in the segment or in the screen, so as to clearly determine the positions of said segment in which the light ray reaches the sensor 31.

It could also be possible to adapt the light-emitting diode 30 at the free extremity of the segment and place a window in front of the phototransistor so as to reduce its optical opening. The feeding of the diode 30 can then be carried out with the aid of sliding contacts co-operating with one or two conductive ranges so as to feed the diode solely when it moves in front of the sensor 31.

Figure 5:
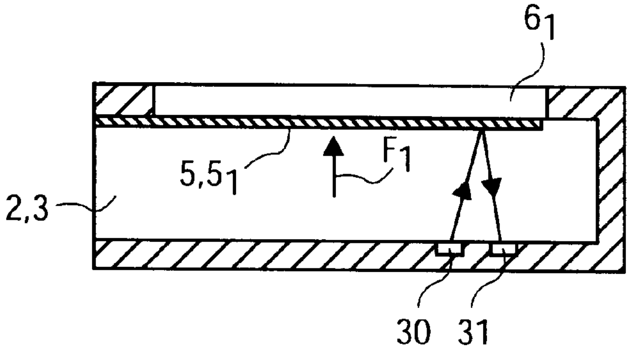
FIG. 5 shows another embodiment variant of a device for the opto-electronic conversion of the vibrations of a free segment into an electric signal.

According to another variant shown on FIG. 5, the extremity of one of the faces of the free segment 5 is covered with a coating reflecting the light emitted by the light source 30.

The light sensor 31 is then placed so as to receive in its rest position the segment 5 and via reflection onto the segment 5 the light emitted by the source 30. When the segment vibrates, the reflected light is deflected so that it no longer fully reaches the sensor 31. The light intensity received by the sensor 31 thus varies and the movement of the segment 5 is therefore converted into an electric signal.

Of course, it is also possible to convert the movements of the free segment into an electric signal by other conversion means, such as with the aid of a piezo-electric sensor integral with the segment, this sensor then being connected to the processing system 20 of the monitoring device.

In the examples above, the means for converting the movements of the free segment into an electric signal are used for monitoring a computer system, but they could also be used for monitoring any other electronic system and especially within the context of an electric musical instrument, such as a free reed instrument.

What is claimed is:

1. A method to control an electronic or computer system, the method including:

translating vibrations of at least one free segment, caused by a fluid current, to generate an electric signal utilizing at least one conversion device associated with the at least one free segment;

processing the electric signal generated by the conversion device; and controlling an action of the system according to results of processing of the electric signal.

2. A method according to claim 1, characterised in that the fluid current results from a flow of air created by any one of inspiration and expiration of an individual.

3. A method according to claim 2, characterised in that, in order to have a breath control movements along two directions of a cursor on a computer screen, the method includes:

for each movement direction using a conduit in which two free segments are placed, each segment being associated with a respective conversion device, the first segment being able to be stressed on vibration by an expiration flow of the breath and the second segment being able to be stressed on vibration by the inspiration flow of the breath, and processing signals generated by the respective conversion devices so that for each movement direction, the inspiration flow corresponds to one movement direction of the cursor and the expiration flow corresponds to a movement direction opposite the one corresponding to the inspiration flow and so that an intensity of the flow corresponds, at least in part, to a movement speed of the cursor.

4. A method according to claim 3, characterised in that it consists of using means to allow inversion of the directions of movements associated with the expiration flow and inspiration flow.

5. A device to convert an action of a fluid current on at least one free segment into an electric signal to control a computer system, the device including:

means for converting vibrations of the at least one free segment, caused by the action of the fluid current, into an electric signal.

6. A conversion device according to claim 5, characterised in that the conversion means is formed by a piezo-electric transducer integral with the at least one free segment.

7. A conversion device according to claim 5, characterised in that the conversion means is formed by an electromagnetic transducer including a magnet and a transducing coil associated with a magnetic circuit including a ferromagnetic portion presented by the at least one free segment at a level of a free extremity whose vibrations disturb a magnetic field generated by the magnet and induce an electromotive force in the transducing coil.

8. A conversion device according to claim 7, characterised in that the magnetic circuit of the transducer includes a mobile adjustment element to be located approximately opposite the at least one free segment so as to allow an adjustment to be made of a distance (d) that is an air gap separating a foot of the mobile adjustment element from the free extremity of the at least one free segment.

9. A conversion device according to claim 5, characterised in that the conversion means is formed by the association of a light source and a light sensor, both placed so that the vibrations of the at least one free segment create an interference with an illumination of the light sensor so as to create a variable electric signal at terminals of the light sensor.

10. A conversion device according to claim 9, characterised in that the light source and the light sensor are located opposite each other and on both sides of the at least one free segment so that the vibrations of the at least one free segment generate a discontinuous illumination of the light sensor so as to create a variable electric signal at the terminals of the light sensor.

11. A conversion device according to claim 10, characterised in that the at least one free segment carries at a free extremity a screen to hide the light source with respect to the light sensor in certain positions of the at least one free segment.

12. A conversion device according to claim 9, characterised in that the light source is constituted by a light-emitting diode and the light sensor is constituted by a phototransistor.

13. A device to control an electronic or computer system with the aid of a fluid current, the device including:

means to apply the fluid current to a free segment and make the free segment vibrate;

at least one conversion means for converting vibrations of the free segment into an electric signal;

means for processing the electric signal generated by the conversion device; and interface means between the processing means and the electronic system.

14. A control device according to claim 13, characterised in that the means to apply the fluid current includes at least one orifice through which an individual is able to suck in or breathe out air so as to create a flow of air at a level of the segment.

15. A device to monitor breath to control movement of a cursor along two directions on a computer screen, the device including:

for each movement direction, a conduit in which first and second segments are placed, each of the first and second segments being associated with a respective conversion device, the first segment being able to be stressed on vibration by an expiration flow of the breath and the second segment being able to be stressed on vibration by an inspiration flow of the breath, and a processor to process signals generated by the conversion devices so that, for each movement direction, the inspiration flow corresponds to a direction of movement of the cursor and the expiration flow corresponds to a direction of movement opposite the one corresponding to the inspiration flow, and so that the intensity of any one of the inspiration and expiration flows corresponds, at least in part, to a movement speed of the cursor.

* * * * *

UNITED STATES PATENT AND TRADEMARK OFFICE

CERTIFICATE OF CORRECTION

PATENT NO. : 6,574,571 B1
DATED : June 3, 2003
INVENTOR(S) : Bonnat

It is certified that error appears in the above-identified patent and that said Letters Patent is hereby corrected as shown below:

Title page,
Item [73], Assignee, please delete "Financial Holding Corporation, Inc., Las Vegas, NV (US)" and insert -- Pierre Bonnat, Grieges (FR) --.

Signed and Sealed this

Twenty-fourth Day of August, 2004

JON W. DUDAS
*Director of the United States Patent and Trademark Office*